United States Patent [19]
Grutter et al.

[11] Patent Number: 5,272,872
[45] Date of Patent: Dec. 28, 1993

[54] METHOD AND APPARATUS OF ON-BOARD CATALYTIC CONVERTER EFFICIENCY MONITORING

[75] Inventors: Peter J. Grutter, Plymouth; Gerald G. Stock, Whitmore Lake, both of Mich.

[73] Assignee: Ford Motor Company, Dearborn, Mich.

[21] Appl. No.: 981,736

[22] Filed: Nov. 25, 1992

[51] Int. Cl.⁵ .......................... F01N 3/20; F02D 4/14
[52] U.S. Cl. ........................................ 60/274; 60/277; 60/285
[58] Field of Search ................ 60/274, 276, 277, 285

[56] References Cited

U.S. PATENT DOCUMENTS

| | | | |
|---|---|---|---|
| 5,077,970 | 1/1992 | Hamburg | 60/285 |
| 5,099,647 | 3/1992 | Hamburg | 60/285 |
| 5,119,628 | 6/1992 | Uema et al. | 60/277 |

*Primary Examiner*—Noah P. Kamen
*Attorney, Agent, or Firm*—Peter Abolins; Roger L. May

[57] ABSTRACT

Apparatus and method are disclosed for monitoring catalytic converter efficiency in treating exhaust gas from an internal combustion engine having fuel control means for controlling the air to fuel ratio at which fuel is supplied to the engine in response to a fuel flow control signal. During a normal operation mode, the control signal means generates the fuel flow control signal based at least in part on output signals from first and second EGO sensors exposed to the exhaust gas upstream and downstream, respectively, of the catalytic converter. The normal operation mode is periodically interrupted by a test operation mode, preferably initiated during substantially steady state operation of the engine, during which the engine is controlled in response to the output signal from the first EGO sensor without the signal from the second EGO sensor. Air to fuel ratio perturbations about a mean value corresponding to stoichiometry are introduced, comprising an initial lean interval of air to fuel ratio higher than stoichiometry, typically for about 5 seconds, followed by a series of rich intervals alternating with lean intervals. An efficiency value for the catalytic converter corresponding to its emissions treatment efficiency is determined based on the number of perturbations detected by the upstream EGO sensor versus the number detected by the downstream EGO sensor.

11 Claims, 5 Drawing Sheets

METHOD AND APPARATUS OF ON-BOARD CATALYTIC CONVERTER EFFICIENCY MONITORING

FIELD OF THE INVENTION

This invention relates to monitoring of catalytic converter efficiency in treating exhaust gas from an internal combustion engine. In particular, the invention relates to air/fuel ratio closed loop fuel control of an internal combustion engine equipped with exhaust gas oxygen (EGO) sensors located upstream and downstream of a catalytic converter, with periodic on-board monitoring of the efficiency of the catalytic converter.

BACKGROUND OF THE INVENTION

It is known that the efficiency or efficacy of a catalytic converter treating the exhaust gas of an engine is significantly effected by the ratio of air to fuel supplied to the engine. At stoichiometric ratio, catalytic conversion efficiency is high for both oxidation and reduction conversions. The air/fuel stoichiometric ratio is defined as the ratio of air to fuel which in perfect combustion would yield complete consumption of the fuel. The air/fuel ratio LAMBDA of an air/fuel mixture is the ratio of (a) the amount by weight of air divided by the amount by weight of fuel actually being fed to the engine at a point in time, to (b) the air/fuel stoichiometric ratio. Closed loop fuel control systems are known for use in keeping the air/fuel ratio in a narrow range about the stoichiometric ratio, known as a conversion window. Closed loop fuel control systems are known utilizing one EGO sensor located before and one after the catalytic converter to maintain the air/fuel ratio inside the conversion window.

It is also known that the efficiency or efficacy of catalytic conversion is affected by the oxygen storage capability of the catalytic converter. A properly operating catalytic converter dampens oxygen concentration fluctuations in the exhaust stream. A system for testing catalytic converter efficiency proposed in SAE paper No. 900062, Detection of Catalyst Performance Using On-Board Diagnostics, employs two exhaust gas oxygen sensors, one upstream and one downstream of the catalytic converter, to detect oxygen content in the exhaust gas. The system employs test signals in the form of an air/fuel ratio swing on both sides of stoichiometry at predetermined rates or frequencies caused by fuel control system perturbations. By comparing the change in response patterns between the upstream and downstream EGO sensors, a determination can be made about catalytic converter efficacy.

A method is needed for accurately and reliably determining catalytic converter efficiency, especially in an on-board system, preferably a method which is suitable for incorporation into an overall fuel control system for the engine.

SUMMARY OF THE INVENTION

According to the invention, an on-board method is provided for monitoring catalytic converter efficiency in treating exhaust gas from an internal combustion engine. Catalytic converter efficiency is determined by measuring a converter characteristic related to hydrocarbon (HC) treatment efficiency, specifically, the oxygen storage capability of the catalytic converter. Advantageously, the method of the invention is for controlling the air to fuel ratio of an air and fuel mixture fed to an internal combustion engine, for treating exhaust gas from the engine; and for periodically conducting on-board monitoring of the catalytic converter efficiency in treating the exhaust gas. Exhaust gas is passed from the engine to the catalytic converter through an upstream exhaust gas conduit while exposing it to a first EGO sensor means for generating a first EGO signal having a value corresponding to the oxygen content level of the exhaust gas. Exhaust gas is passed downstream from the catalytic converter through a second exhaust gas conduit means while exposing it to a second EGO sensor means for generating a second EGO signal having a value corresponding to the oxygen content level in the downstream exhaust gas. Fuel control means are operated for controlling the air to fuel ratio at which fuel is supplied to the engine in response to a fuel flow control signal. The fuel control means is operated, during a normal operation mode, as a dual EGO closed loop fuel control system in accordance with techniques well known to those skilled in the art. Thus, for example, in one preferred embodiment the fuel flow control signal of the fuel control means is generated based on the first EGO sensor to maintain the ratio generally within limits defining a range about a mean air to fuel ratio value corresponding to a stoichiometric air to fuel ratio. The mean air to fuel ratio value is adjusted or "trimmed" based on the second, that is downstream, EGO signal in accordance with the aforesaid known techniques.

The method further comprises conducting a test of the efficiency of the catalytic converter by interrupting the normal operation mode with a test operation mode of the fuel control means, comprising closed loop fuel control based on at least the first EGO signal without the second EGO signal. Air to fuel perturbations are generated comprising establishing an initial lean interval of air to fuel ratio higher than stoichiometry. The initial lean interval is followed by a series of rich intervals of air to fuel ratio lower than stoichiometry, alternating with lean intervals. An efficiency value for the catalytic converter is determined on the basis of the number of the perturbations following the initial lean interval which are detected by the first EGO sensor means compared to the number detected by the second EGO sensor means. The efficiency value is then compared to a pre-determined, stored value corresponding to minimum acceptable efficiency of the catalytic converter. A catalytic converter failure signal can be generated, or other action taken, in the event that the comparison of the efficiency value to the stored value indicates catalytic converter efficiency below the minimum acceptable level. After completion of the test mode, the perturbations are terminated and the fuel control means again is operated in the normal operation mode as a dual EGO sensor fuel control system.

Preferred embodiments of the invention can provide significant advantages, particularly with respect to on-board monitoring of the efficiency of a catalytic converter, particularly a three-way catalyst type catalytic converter. Such preferred embodiments, discussed in greater detail below, provide the advantages of a dual EGO closed loop fuel control system with periodic on-board catalytic converter monitoring. In particular, the initial lean interval provides in such embodiments enhanced accuracy and reliability. The amplitude, frequency and shape of the perturbations in the air to fuel ratio are easily calibrated for a given engine system employing techniques and system components well known to those skilled in the art. Additional features and advantages of various preferred embodiments will be better understood in view of the following disclosure and detailed description.

BRIEF DESCRIPTION OF THE DRAWINGS

Various preferred embodiments of the invention are described below with reference to the accompanying drawings wherein.

DETAILED DESCRIPTION OF CERTAIN PREFERRED EMBODIMENTS

Those skilled in the art will understand from the foregoing disclosure that the present invention may be embodied in apparatus, method and system for periodic on-board monitoring or diagnosis of the efficiency of a catalytic converter treating exhaust gas from an internal combustion engine. The terms "efficiency" and "efficacy" are used here interchangeably to mean any suitable measure or valuation of the effectiveness of the catalytic converter. Thus, the aforesaid catalytic converter efficiency value may be determined, stored or expressed as a ratio, a fraction or the like of perturbations perceived by the first EGO sensor versus those perceived by the second EGO sensor. By "periodic" is meant occasionally or intermittently, for example once or more often each time operation is restarted after a period of non-operation. In that regard, reference to initiating the test or test period during substantially steady state operation of the engine means starting the tests when the engine is in dual EGO sensor closed loop operation, preferably under normal speed and load conditions, and not necessarily that the engine will remain under such conditions or even at steady state during the entire planned test period.

As indicated above, the catalytic converter monitoring is most advantageously implemented in embodiments comprising a dual EGO sensor closed loop fuel control system utilizing both an upstream and a downstream EGO sensor and having an adaptive upstream EGO (preferably HEGO) switchpoint. Such fuel control systems are well known to those skilled in the art and can be readily adapted, given this disclosure and description of the present invention, to provide the aforesaid catalytic converter on-board monitoring. Suitably adaptable fuel control systems are described, for example, in U.S. Pat. No. 3,939,654 to Creps and U.S. Pat. No. 4,027,477 to Storey, the teachings of which are incorporated herein by reference. Each of these patents describes a dual EGO sensor closed loop fuel control system wherein a first control loop includes an upstream EGO sensor and a proportional controller. A second control loop includes a downstream EGO sensor and a dual integrator controller. Other such systems are taught by U.S. Pat. No. 4,831,838 to Nagai et al and by U.S. Pat. No. 4,840,027 to Okumura, each of which utilizes a proportional and integral (PI) controller in a first control loop with an upstream EGO sensor. The teachings of both are incorporated herein by reference. In one embodiment of the systems taught by the Nagai et al and the Okumura patents, calibratable parameters of the PI controller may be modified based on the output of a downstream EGO sensor. The modifiable parameters include a skip amount, or jumpback, and an integration amount, or ramp, for a control limit cycle. Other control system parameters, such as time delay and reference voltage, may also be modified based on the output of a downstream EGO sensor. The output of the downstream EGO sensor may also be used to generate a second air/fuel ratio correction amount used in a main fuel control equation.

Other known fuel control systems using dual EGO sensors, one upstream and one downstream of a catalytic converter, suitable for application in embodiments of the present invention, have a cascade control scheme wherein a signal from the downstream EGO sensor is applied to a summer with a reference signal. The output of the summer is applied to a first PI controller. An output signal from the upstream EGO sensor is applied to a second summer together with the output of the first PI controller. The output of the second summer is applied to a second PI controller which then generates the feedback signal to control engine air/fuel ratio. In other suitable schemes both of the summers have an applied reference signal. The output of the first PI controller is not applied to the second summer, but instead controls the parameter of the second PI controller. This is known as parametric control, because the parameters of the second controller are themselves controlled by the output of the first controller.

For purposes of illustration and not limitation, the preferred embodiments disclosed and discussed below provide dual EGO fuel control apparatus, methods and systems for an internal combustion engine incorporating the on-board catalytic converter monitoring aspect of the invention in a dual EGO fuel control apparatus. In such preferred embodiments, as described in detail below, an internal combustion engine is provided with a catalytic converter and two EGO sensors, one upstream and the other downstream of the converter. The fuel control system includes a first comparator for generating a first signal from the output signal of the upstream EGO sensor. Such first signal has a constant absolute value (e.g., "one") but varies in sign as a function of the upstream EGO sensor output signal. A second comparator, or alternatively limiting means, generates a second signal as a function of the downstream EGO sensor signal. The second signal also has a constant absolute value, varying in sign as a function of the downstream EGO sensor output signal. Corrective means comprising a high pass filter responsive to the first signal generates a third signal. Means to combine the scaled second signal with the third signal generate a fourth signal and control means using a PI controller responsive to the fourth signal generates an air/fuel ratio correction signal. Preferably the control system further provides means for open loop control of the air/fuel mixture, independent of the EGO sensor output signals, during certain periods, for example, initial engine operation while one or both EGO sensors have not reached operational temperature.

The system has a normal operation mode and, in accordance with the on-board catalytic converter monitoring aspect of the present invention, a test operation mode. During the latter mode, the processed signal from the downstream EGO sensor is replaced by a perturbation signal, as discussed above. The perturbation signal is generated by a signal generator in accordance with known means and techniques. The signal generator preferably is a functional feature of the engine control computer. The fuel flow control signal is based during the test mode on (a) the rich/lean switching of the upstream EGO sensor in accordance with well known means and techniques, about a mean air to fuel ratio value corresponding to stoichiometry as last adjusted or "trimmed" by downstream EGO sensor prior initiating the test operation mode, and (b) the perturbation signal, including an initial lean interval signal to increase the ratio of air to fuel to establish a lean base line, followed by alternating rich and lean perturbation signals. The output of the upstream and downstream EGO sensors are then evaluated over the test interval. Specifically, the number of such perturbations detected in the upstream exhaust gas by the upstream EGO sensor is compared to the number of perturbations detected in the downstream exhaust gas (i.e., downstream of the catalytic converter) by the downstream EGO sensor. Of course, those skilled in the art will recognize that independent sensors may be used for counting the perturbations, rather than EGO sensors used in a fuel control system. The initial lean baseline is established preferably for about one to ten seconds, most preferably about five seconds, by the initial lean interval signal increasing the air to fuel ratio preferably about 3% to 7%, most preferably about 5% from the mean air to fuel ratio value corresponding to stoichiometry. The immediately following series of alternating rich and lean perturbations preferably also are about 3% to 7% from the mean air to fuel ratio.

The alternating perturbations are not necessarily symmetrical about the mean value. Short pulses 5% to 7% richer than stoichiometry may alternate with longer pulses only 3% to 5% leaner, or visa versa. The shape of the pulses may be a square wave, or a rounded wave form, e.g., a sinusoidal wave form. The duration of the alternating perturbations preferably is from about 50 to about 200 msec, most preferably about 100 msec for a typical motor vehicle engine system.

If excessively long, too many of the rich pulses will exhaust the stored oxygen in the catalytic converter and be detected in the downstream exhaust gas, leading to rejection of even acceptably functioning converters. Preferably the alternating perturbations have a 2 Hz to 10 Hz frequency. It will be recognized by those skilled in the art that this frequency is higher than the 1 Hz frequency of the fuel control limit cycle typical in current motor vehicle engine closed loop fuel control systems. In a typical 20 second test mode period, a 5 second lean interval to precondition the converter is followed by rich perturbations alternating with lean perturbations at 2 Hz to 5 Hz frequency for the remaining 15 seconds. Thus, in a typical 20-second test, following the 5-second initial lean interval, 30–75 alternating rich and lean perturbations can generally be accomplished, providing a statistically significant basis for the catalytic converter efficiency test. The resulting value based on comparing the number of alternating perturbations detected upstream and downstream of the catalytic converter represents the catalytic converter condition and is compared with a predetermined stored value which defines a borderline efficiency or efficacy. A failure signal is generated if the comparison indicates catalytic converter efficacy below the borderline level.

Figure 1:
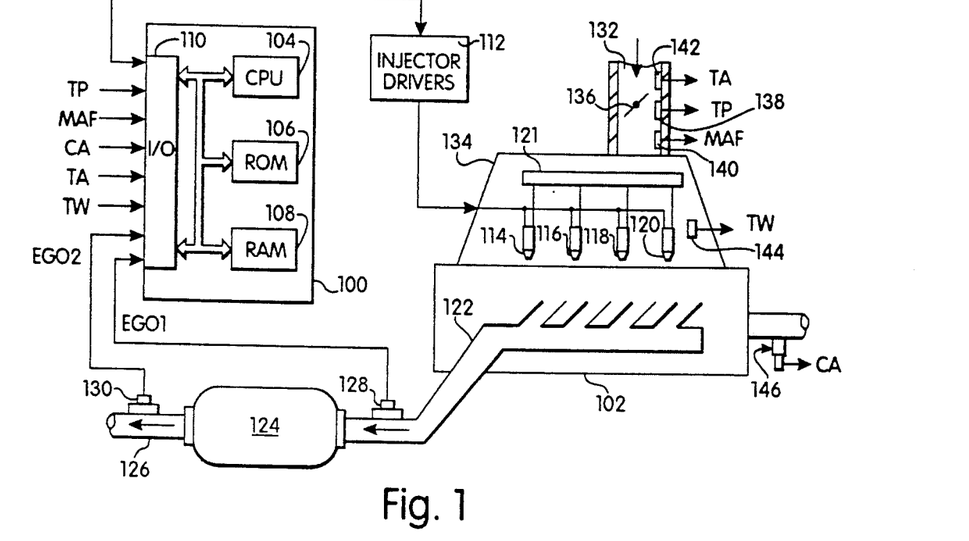
FIG. 1 is a schematic view of a motor vehicle internal combustion engine together with apparatus for controlling the air/fuel ratio of the air and fuel mixture to the engine, for treatment of the exhaust gas from the engine, and for periodically monitoring catalytic converter efficacy in the treatment of the exhaust gas in accordance with a preferred embodiment of the invention.

Referring to FIG. 1, microcomputer 100 is shown for controlling an air/fuel ratio supplied to an internal combustion engine 102. Microcomputer 100 comprises a central processing unit (CPU) 104, a read-only memory (ROM) 106 for storing a main engine control routine and other routines, such as a fuel flow routine and calibration constants, look-up tables, etc., a random access memory (RAM) 108, and a conventional input/output (I/O) interface 110. Interface 110 includes analog to digital (A/D) converters for converting various analog input signals, digital inputs, digital to analog (D/A) converters for converting various digital outputs, and digital outputs.

Microcomputer 100 also includes other conventional elements, such as a clock generator and means for generating various clock signals, counters, drivers, and the like. Microcomputer 100 controls the air/fuel ratio by actuating injector drivers 112 in response to operator actions and various operating conditions and parameters of engine 102. Microcomputer 100 fetches input parameters and performs calculations of control signals at a fixed sampling interval DELTA T ($\Delta T$) such as, for example, 20 msec. If microcomputer 100 is designed to operate with a variable sampling rate, a timer which can perform time measurement between two successive samplings and assign a measured sampling time DELTA T should be provided.

Engine 102, in this particular example, is shown as a conventional four cylinder gasoline engine having fuel injectors 114, 116, 118 and 120 coupled to a fuel rail 121. Each fuel injector is electronically activated by respective signals from injector driver 112. Each of the injectors 114, 116, 118 and 120 is also coupled in a conventional manner to a respective combustion cylinder. Exhaust gases from the combustion cylinder are routed to an exhaust manifold 122 and are discharged through a three-way catalytic converter 124 which removes CO, HC and $NO_x$ pollutants from the exhaust gas, and exhaust pipe 126. In the exhaust manifold 122, upstream of the catalyst 124, is a first EGO sensor 128 (EGO1) for detecting oxygen concentration in the engine exhaust gases. In the exhaust pipe 126, downstream of the catalyst 124, is a second EGO sensor 130 (EGO2) for detecting oxygen concentration after catalyst 124. Both EGO sensors 128 and 130 generate output voltage signals which are transmitted to the analog to digital converter of I/O interface 110. Various suitable alternative EGO sensors are known and will be apparent to those skilled in the art, including heated EGO (HEGO) sensors, etc. In that regard, the discussion of exemplary suitable EGO sensors in U.S. Pat. No. 5,077,970 to Hamburg is incorporated herein by reference.

Air intake 132 is shown coupled to intake manifold 134 for inducting air past throttle plate 136 into the combustion cylinders. Throttle position sensor 138 is coupled to throttle plate 136 for providing a throttle position signal TP. Also coupled to intake manifold 134 are mass airflow sensor 140 for providing mass airflow signal MAF corresponding to the mass of the airflow induced into engine, and air temperature sensor 142 for providing a signal TA indicative of the temperature of the induced air. Coupled to the cylinder block of engine 102 is a cooling water temperature sensor 144 for providing signal TW indicative of the engine coolant temperature. Crank angle position sensor 146 is coupled to the crankshaft of engine 102 for providing crank angle position signal CA indicative of crank position.

A manifold pressure sensor MAP may be used instead of a mass airflow sensor 140 to provide an indication of engine load by known techniques. Other conventional components necessary for engine operation, such as a spark delivery system are not shown in FIG. 1. It is also recognized that the invention may be used to advantage with other types of engines, such as engines having a number of cylinders other than four, rotary engines, etc.

Figure 2:
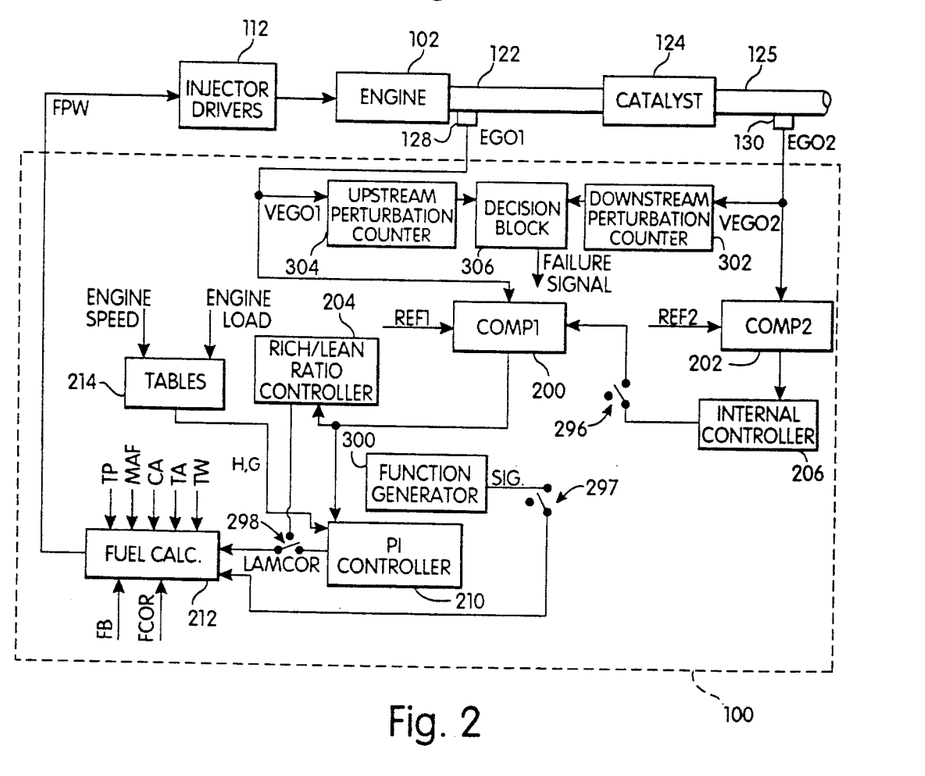
FIG. 2 is a control block diagram of the fuel control, exhaust treatment and monitoring system of the embodiment of FIG. 1.
Figures 3, 4:
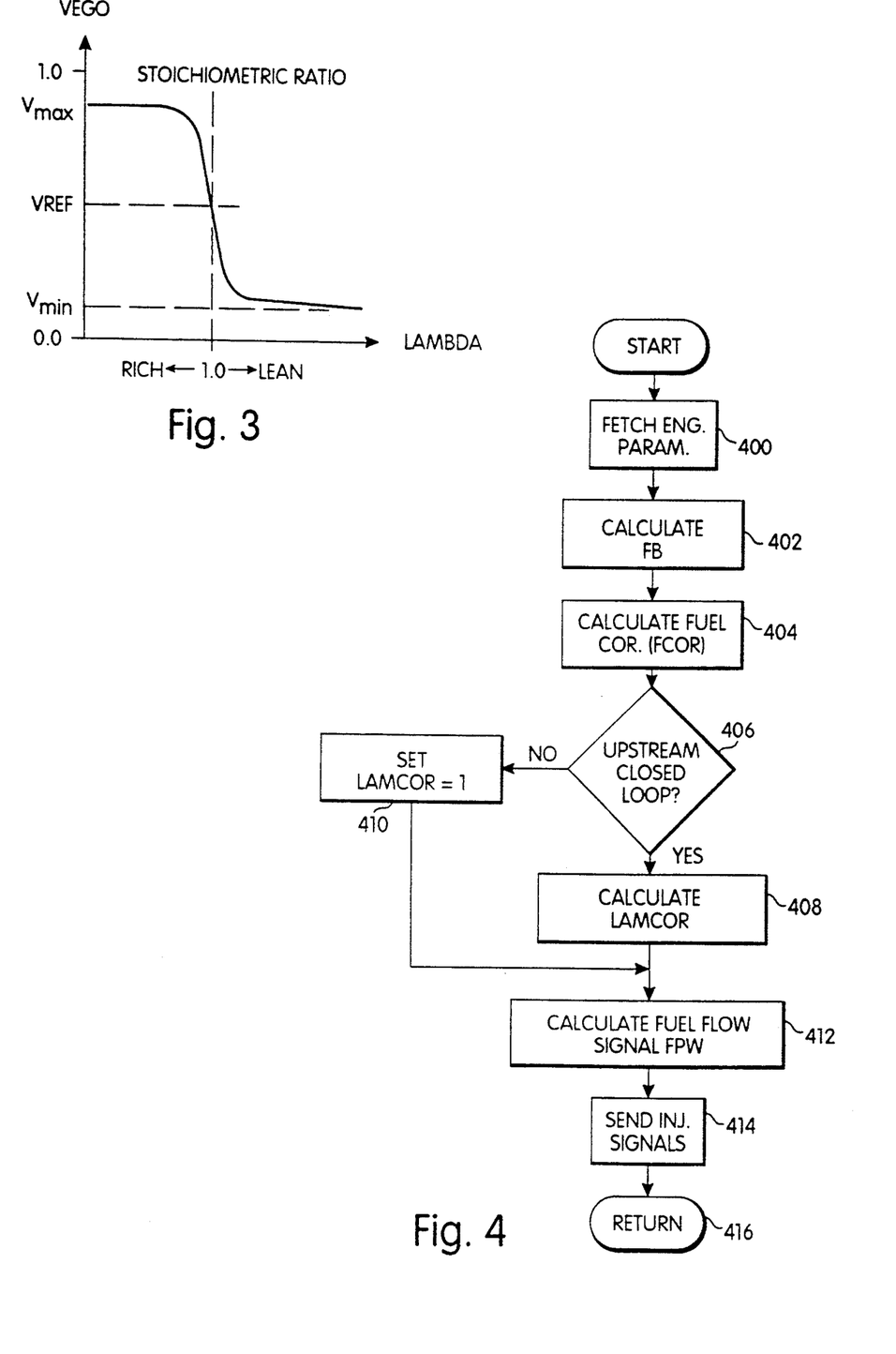
FIG. 3 is a graph showing voltage output of an EGO sensor as a function of the air/fuel ratio LAMBDA.
FIG. 4 is a flow chart illustrating process steps performed in calculating fuel flow rate FPW during normal operation mode of the apparatus of FIGS. 1 and 2.

The operation of a dual EGO sensor closed loop fuel control system in controlling air/fuel ratio is now described with particular reference to a control block diagram shown in FIG. 2 and the associated graph in FIG. 3 showing the EGO sensor output voltage VEGO as a function of LAMBDA, the air/fuel ratio relative to air/fuel stoichiometric ratio. Although this description is related to microcomputer realization, the control system also can be implemented by analog means.

Output voltages VEGO1 and VEGO2 from upstream EGO1 sensor 128 and downstream EGO2 sensor 130, respectively, are fed through an A/D converter in I/O device 110 to respective comparators 200 and 202. Each comparator is supplied with reference signals REF1 and REF2, respectively, corresponding to EGO output voltage at stoichiometric ratio, VREF, as shown in FIG. 3. Each comparator 200 and 202 produces an output signal COMP1 and COMP2, respectively, having a constant absolute value, but varying in sign depending upon which side of stoichiometric ratio the corresponding EGO output voltage signal, VEGO1 and VEGO2, respectively, is.

The output COMP1 of comparator 200 is fed to rich/lean ratio controller 204, and to PI controller 210. The output COMP2 of the second comparator 202 is fed to integral controller 206. The output of integral controller 206 is fed to comparitor 200 via switch 296. Switch 296 is closed in normal operation mode such that the output signal from integral controller 206 is used to modify the comparison voltage at which COMP 1 determines whether the signal EGO1 from upstream EGO sensor 128 is rich or lean. For test mode, switch 196 is opened to freeze the comparison voltage at which COMP1 makes such determination at the value the comparison voltage had upon commencement of the test mode.

The output COMP1 of first comparitor 200 is fed to PI controller 210 and also to rich/lean ratio controller 204. During normal operating mode, the output signal of PI controller 210 is fed to fuel calculation block 212 via switch 298. In test mode, the output signal of rich/lean controller 204, in lieu of the signal from PI controller 210, is fed to fuel calculation block 212 via switch 298. PI controller block 210 is preferably a proportional and integral controller, calculating the output signal LAMCOR representing an air/fuel ratio correction amount. Input values H and G from stored Tables 214 for calculating LAMCOR based on COMP1 are jumpback and ramp, respectively, of the PI controller, calibratable parameters of the control system. The value of parameters H and G may be stored in Tables 214 as a function of speed and engine load. The output signal SIG from function generator 300 is fed to fuel calculation block 212 during test mode. The three switches 296, 297 and 298 are functionally ganged within microcomputer 100 to switch together from normal mode to test mode. So, in normal mode switch 296 is closed, switch 297 is open, and switch 298 connects PI controller 210 to fuel calculation block 212. In test mode, switch 296 is open, switch 297 is closed, and switch 298 connects rich/lean ratio controller 204 to fuel calculation block 212.

Fuel calculation block 212 calculates fuel flow rate FPW, a control signal to the injector drivers 112, in a conventional manner. The calculation may employ a base open loop fuel flow value, which preferably is a function of engine load/speed table fetched from ROM 106 storage or stored in fuel calculation block 212. The calculation also may employ a fuel correction amount based, for example, on engine warm-up temperature, battery voltage and the like, also preferably from look-up tables.

A preferred operation of microcomputer 100 in controlling fuel flow during normal operation mode is now described with particular reference to the flowchart shown in FIG. 4. It will be recognized by those skilled in the art, that the fuel control subroutine illustrated in FIG. 4 typically will be one of a series of sub-routines performed repeatedly in sequence in the course of engine control, along with, for example, a spark control sub-routine, an EGR subroutine, etc.

At the start of each sampling interval engine parameters are fetched in step 400. Engine speed and load are then computed in a conventional manner from crank position signal CA and mass airflow signal MAF. During step 402, base open loop fuel injection amount FB is determined by look-up and interpolation of speed/load table from ROM 106 storage. At step 404, fuel correction amount FCOR is calculated based on inputs, for example, intake air temperature TA and cooling water temperature TW, battery voltage, and the like.

Step 406 checks whether upstream EGO sensor 128 is warmed-up sufficiently and/or other conditions are met to start closed loop operation. These conditions may include, but are not limited to, cooling water temperature TW reaching a preselected limit, inlet air temperature TA, observed EGO sensor switching, elapsed time since start, and the like. Also, some engine operations, such as wide open throttle or prolonged idle, may require open loop control even after closed loop conditions are otherwise met. The engine can operate with both upstream open loop and downstream open loop control, that is, the signals from both the upstream EGO sensor and the downstream EGO sensor are disregarded. Typically, this occurs, for example, during cold start-up and/or any time the EGO sensors are not sufficiently heated. If the control system is in upstream open loop control, then in the preferred embodiment here described it will also always be in downstream open loop control. In some conditions, it will have upstream closed loop (i.e., the control system will receive and use the upstream EGO sensor signal) with downstream open loop. This may occur, for example, when the upstream EGO sensor has been sufficiently heated but the downstream EGO sensor has not yet been sufficiently heated, and/or during some hard acceleration conditions, as is well understood by those skilled in the art. Under normal, routine conditions, however, the system will employ upstream closed loop and downstream closed loop control.

If closed loop control is called for, step 408 calculates air/fuel ratio correction amount LAMCOR, the output signal of PI controller 210 representing an air fuel ratio closed loop correction amount. Otherwise, in step 410 LAMCOR is set to 1. The frequency of the limit cycle is mainly determined by parameters of the upstream portion of the control system. However, the downstream EGO sensor provides a bias which shifts the rich/lean switching point for the upstream EGO sensor signal, making the limit cycle asymmetrical around its reference voltage REF1. In the same time, the output of downstream EGO2 sensor is centered around its reference voltage REF2. Output LAMCOR of the PI controller exhibits two jumps: the first jump is due to the upstream EGO sensor crossing its reference voltage REF1, and the second jump is due to the downstream EGO sensor crossing its reference voltage REF2. Logic flow from both step 410 and 408 goes to step 412 in which fuel calculation block 212 calculates a fuel flow signal FPW based on LAMCOR. Signal FPW energizes fuel injectors in step 414. Step 416 returns the system from the fuel flow calculation routine to the main routine.

It is understood that during different engine operations, specifically, at different speeds and loads, control system calibratable parameters may require readjustments for optimal control. These parameters include, for example, jumpback H and ramp G of PI controller 210. To achieve a recalibration of parameters, a number of functions or tables (e.g., table 214 in FIG. 2) with engine speed and load as inputs may be incorporated. It is also understood that certain measures, such as time delays or filters, may be employed to protect the control system from effects of high frequency EGO sensor switching. Such modifications can be readily incorporated into various preferred embodiments of the invention by those skilled in the art in view of the present disclosure.

Operation of the system for periodic catalytic converter monitoring while continuing to control fuel flow to the engine is now described with reference to FIGS. 2, 5A, 5B, 6 and 7. A test interval typically will commence during substantially steady state, engine operation and will span about 20 seconds. Multiple attempts may be required before a valid test is completed. One or multiple valid tests may be run during a given period of continuous operation. A monitoring test is commenced during normal closed loop operation. The term "periodic" is used to mean occasionally or intermittently, for example, once (or more often) each time engine operation is restarted after a period of non-operation. In that regard, reference to initiating the test period during substantially steady state operation of the engine means starting the test period when the engine is in dual closed loop operation, not necessarily that all engine operating parameters are constant, and not necessarily that the engine will remain at steady state during the entire planned test period.

At the beginning of the test, switches 296, 297 and 298 are switched to test mode. Thus, the output signal from rich/lean controller 204 is substituted for that of PI controller 210, and the signal from integral controller 206 is removed from comparitor 200. Switch 297 is closed to feed a test signal SIG from a signal generator, shown as function generator 300 in FIG. 2, to the fuel calculation block 212. As discussed above, the test signal SIG establishes the initial lean interval and the subsequent alternating rich and lean perturbations, preferably as a periodic function having a frequency higher than the limit cycle frequency for closed loop fuel control based on the upstream EGO sensor. The perturbation signal can in this sense be referred to as a high frequency signal.

It should be recognized that the impact of the perturbation signal, and the test mode operation, on actual engine performance will generally be imperceptible to the operator. The value of FPW sent to injector drivers 112 is primarily determined by the value of FB. The test signal perturbs the value of FB only slightly about its stoichiometric value.

Figure 5A:
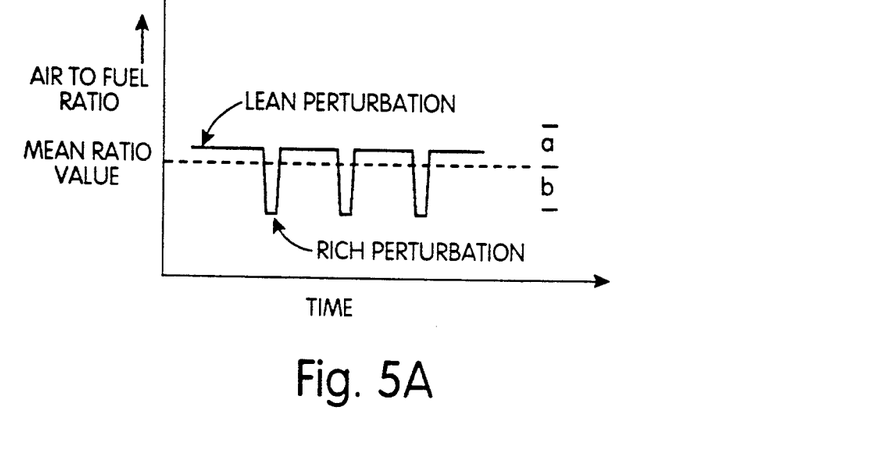
FIG. 5A is a graph showing perturbations of the air to fuel ratio during test operation mode of the system of FIGS. 1 and 2.
Figure 5B:
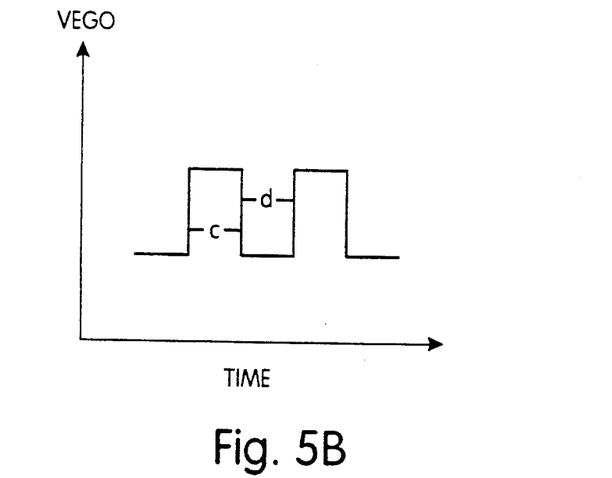
FIG. 5B is a graph corresponding to FIG. 5A, showing perturbations in the upstream EGO sensor output signal.

As mentioned above, the alternating rich and lean perturbations may have an asymmetric waveform alternating about the mean air to fuel ratio value corresponding to stoichiometry (as last adjusted based on the downstream EGO sensor before switching to test operation mode). In accordance with certain particularly preferred embodiments of the invention, the fuel control means controls the perturbations, following the initial lean interval, to a desired rich/lean ratio (which need not be 1.0) by comparing the time duration of each rich perturbation interval with the time duration of one or both adjacent lean perturbation intervals. In this usage an adjacent interval is one immediately preceding or immediately following the rich perturbation. Referring to FIGS. 5A and 5B, a square wave (for ease of illustration) series of rich perturbations of amplitude "a" above the mean air to fuel ratio value corresponding to stoichiometry is shown to alternate with longer lean perturbations of lower amplitude "b". The amplitudes "a" and "b" are controlled by the values of "c" and "d" (not shown to scale) in FIG. 5B. Value "c" is the time duration of a rich perturbation detected by the upstream EGO sensor. Value "d" is the duration of an adjacent lean perturbation. The upstream perturbation counter 304 may be adapted to measure and compare time duration in accordance with means and techniques well known to those skilled in the art. Thus, the aforesaid preference for equal and opposite perturbations is accomplished in certain preferred embodiments by a closed loop control function of the fuel control system comprising measuring and comparing the time duration of adjacent rich and lean perturbations to set appropriate percentage deviations from the mean air to fuel ratio value.

The signals VEGO1 and VEGO2 from the upstream and downstream EGO sensors, respectively, are fed to perturbation counters, comprising, for example, signal filter and register means. Upstream perturbations counter 304 counts air to fuel ratio perturbations in the upstream exhaust gas. Downstream perturbation counter 302 similarly counts perturbations in downstream exhaust gas. The counts from each are fed to decision block 306 which compares the counts in any suitable manner, for example, by calculating the percentage of upstream perturbations detected downstream. The decision block then compares the resulting catalytic converter efficiency value to a stored value predetermined to correspond to minimum acceptable catalytic converter efficiency. The stored value can be readily predetermined empirically by those skilled in the art and will depend upon the engine system characteristics and the magnitude of the perturbations. For reliability and accuracy, the perturbations preferably are configured for a given engine system to yield a stored value between 40% and 60%, preferably about 45%, corresponding to minimum acceptable catalytic converter efficiency. Thus, if a higher percentage of upstream perturbations are detected in the downstream exhaust gas, the decision block generates a failure signal or initiates other appropriate action.

Optionally, the failure signal may trigger a light and/or sound alarm to the vehicle operator. Also optionally, a pass signal may be generated when the test result does not exceed the preset value.

Figure 7:
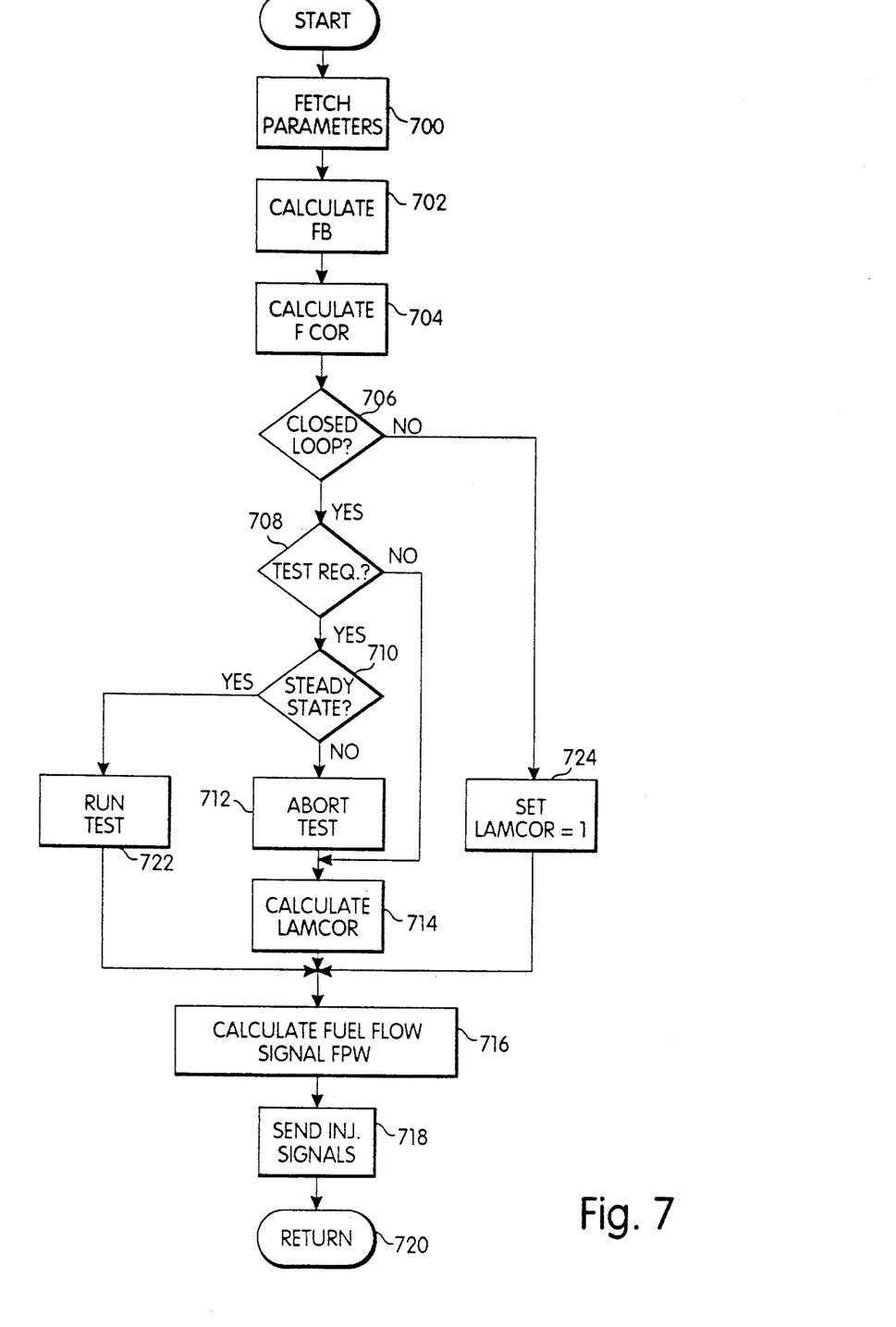
FIG. 7 is a flow chart illustrating process steps to calculate fuel flow rate and perform catalyst monitoring in accordance with the embodiment of FIGS. 1 and 2.

The operation of microcomputer 100 in controlling fuel flow to the engine 102 during catalytic converter monitoring mode is illustrated by the flowchart of FIG. 7. At the start of each sampling interval, engine parameters are fetched in step 700. Engine speed and load are computed in the conventional manner from crank position signal CA and mass air flow signal MAF. During step 702, base open loop fuel injection amount FB is determined by look-up and interpolation of speed/load table from ROM 106 storage. At step 704, fuel correction amount FCOR is calculated based, for example, on engine warm-up conditions, intake air temperature TA, cooling water temperature TW, battery voltage, and the like. Some engine operation conditions, such as wide open throttle or prolonged idle may require open loop fuel control even after other closed loop conditions are met. Thus, closed loop requirements are checked in step 706. If closed loop fuel control requirements are not met, step 724 sets air/fuel ratio correction amount LAMCOR to 1. Step 716 calculates final fuel flow FPW based on the main fuel flow equation as discussed above for normal operation mode. Fuel injectors are energized in step 718, and step 720 returns to the main microcomputer routine.

If closed loop fuel control requirements are found to be met in step 706, step 708 checks whether a catalytic converter test is required. A test may be required, for example, if a test has not been successfully completed during the present operation of the engine since start-up following a period of non-operation. If a test is required, steady state conditions are verified in step 710. In addition, step 710 may check whether additional pre-conditions are met. Applicable government regulations may specify and define steady vehicle and engine speed and load conditions, upstream and downstream EGO sensor warm-up, etc. If all such conditions are not met, step 712 aborts the test. Step 714 then calculates the air/fuel ratio correction amount for dual EGO sensor closed loop fuel control as discussed above for normal operation mode. If conditions in step 710 are met, the catalytic converter efficiency test is conducted by step 722, followed by steps 716, 718 and 720, as above. The return step 720 may return the process directly to the start block immediately preceding block 700 or to the main routine for cycling through to block 700 in due course.

Figure 6:
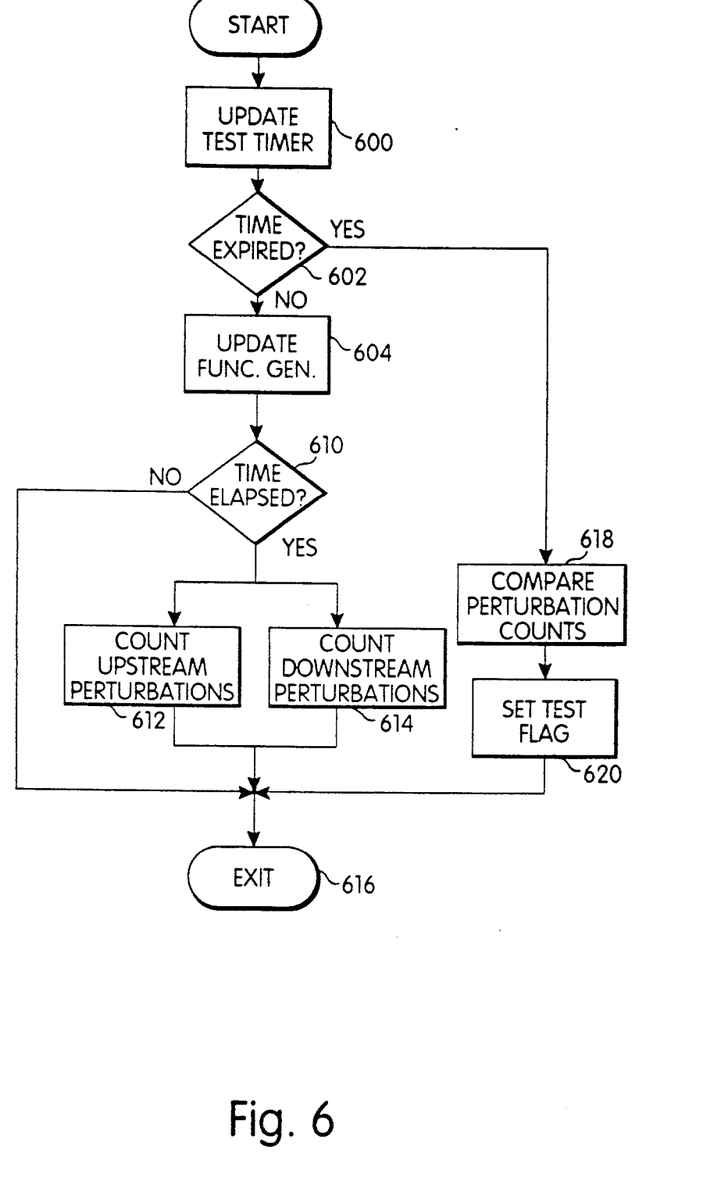
FIG. 6 is a flow chart illustrating process steps performed in conducting an efficacy test of the catalytic converter of the embodiment of FIGS. 1 and 2 in accordance with the overall fuel flow control process.

The operation of microcomputer 100 in step 722 for conducting a catalytic converter efficiency test is illustrated in the flowchart of FIG. 6. Applicable regulations may require that the test be completed in a specified time period, for example, 20 seconds. Preferably, therefor, microcomputer 100 comprises a timer to monitor the time elapsed since test initiation. The timer is updated in step 600. Step 602 checks whether the preset test duration has expired. If the test duration time has not expired, step 604 updates function generator 300 which provides periodic test function SIG. As mentioned above, an initial lean interval is established before alternating perturbations are generated and counted, preferably from 0.25 second to 10 seconds, typically about 5 seconds. Accordingly, the elapsed time since test initiation is checked in step 610. When elapsed time has exceeded a preset value, typically 5 seconds, steps 612 and 614 count detectable perturbations in the upstream and downstream exhaust gases, respectively, as described above regarding calculation blocks 302 and 304, respectively, in FIG. 2. Step 616 provides exit to step 716 in the flowchart of FIG. 7. The process may thereafter be repeated in one or more additional cycles. After the test interval expires, as determined by step 602, step 618 calculates the catalytic converter efficiency value, typically by dividing the total counted number of perturbations detected in the downstream exhaust gas by the total counted number in the upstream exhaust gas, and comparing the result to the stored value predetermined to correspond to minimum acceptable catalytic converter efficiency. If called for, the decision block 618 can initiate a failure signal, as described above in connection with decision block 306 in FIG. 2.

The reading of the foregoing description of certain preferred embodiments by those skilled in the art will bring to mind further alterations and modifications within the spirit and scope of the invention. It is intended that the scope of the following claims include all such alternations and modifications.

We claim:

1. A method for controlling the air to fuel ratio of an air and fuel mixture fed to an internal combustion engine, for treating exhaust gas from the engine, and for periodically monitoring catalytic converter efficacy in treating the exhaust gas, comprising the steps of:
   (A) passing exhaust gas from the engine to the catalytic converter through first exhaust gas conduit means while exposing the exhaust gas to a first EGO sensor means for generating a first EGO signal having a value corresponding to oxygen content level therein;
   (B) passing exhaust gas from the catalytic converter through a second exhaust gas conduit means while exposing it to a second EGO sensor means for generating a second EGO signal having a value corresponding to oxygen content level therein;
   (C) operating fuel control means for controlling the air to fuel ratio at which fuel is supplied to the engine in response to a fuel flow control signal, the air to fuel ratio cycling, during a normal operation mode, generally within limits defining a range about a value corresponding to a stoichiometric air to fuel ratio, the fuel flow control signal during a normal operation mode of the fuel control means being based on at least the first EGO signal and the second EGO signal;
   (D) conducting a test of the efficiency of the catalytic converter by interrupting the normal operation mode with a test operation mode of the fuel control means during a test period, comprising conducting closed loop fuel control based on at least the first EGO signal without the second EGO signal, with air to fuel ratio perturbations comprising (a) an initial lean interval of air to fuel ratio higher than stoichiometry followed by a series of rich intervals alternating with lean intervals about a mean air to fuel ratio value corresponding substantially to stoichiometry, and (b) determining an efficiency value based on the number of said perturbations detected by the first EGO sensor means versus the number detected by the second EGO sensor means; and (E) comparing the efficiency value to a predetermined stored value corresponding to minimum acceptable efficiency of the catalytic converter.

2. The method of claim 1 further comprising the step of generating the catalytic converter failure signal when the comparison of step (F) indicates catalytic converter efficiency below said minimum acceptable efficiency.

3. The method of claim 1 wherein the initial lean interval is from 0.25 to 10 seconds in duration, during which the air to fuel ratio is from 3% to 5% higher than stoichiometry.

4. The method of claim 1 wherein the perturbations during the alternating rich and lean intervals following the initial lean interval follow a sinusoidal wave form with maximum and cumulative deviation from stoichiometry being equal and opposite for the alternating rich and lean intervals.

5. The method of claim 4 wherein the rich and lean intervals are of equal time duration.

6. The method of claim 5 wherein the duration of the rich and lean intervals is from 50 to 200 msec.

7. The method of claim 1 wherein the perturbations following the initial lean interval have a frequency of from 2 Hz to 5 Hz.

8. The method of claim 1 wherein the efficiency value is the ratio of the number of said perturbations, following the initial lean interval, detected by the second EGO sensor to the number detected by the first EGO sensor.

9. The method of claim 1 wherein the fuel control means controls the perturbations, following the initial lean interval, to a predetermined ratio of rich and lean intervals by comparing each time duration the first EGO sensor senses a richer than stoichiometric air to fuel ratio to the time duration it senses an adjacent leaner than stoichiometric air to fuel ratio.

10. A method for controlling the air to fuel ratio of an air and fuel mixture fed to an internal combustion engine, for treating exhaust gas from the engine, and for periodically monitoring catalytic converter efficacy in treating the exhaust gas, comprising the steps of:

(A) passing exhaust gas from the engine to the catalytic converter through first exhaust gas conduit means while exposing the exhaust gas to a first EGO sensor means for generating a first EGO signal having a value corresponding to oxygen content level therein;

(B) passing exhaust gas from the catalytic converter through a second exhaust gas conduit means while exposing it to a second EGO sensor means for generating a second EGO signal having a value corresponding to oxygen content level therein;

(C) operating fuel control means for controlling the air to fuel ratio at which fuel is supplied to the engine in response to a fuel flow control signal, the air to fuel ratio cycling, during a normal operation mode, generally within limits defining a range about a value corresponding to a stoichiometric air to fuel ratio, the fuel flow control signal during a normal operation mode of the fuel control means being based on at least the first EGO signal and the second EGO signal;

(D) conducting a test of the efficiency of the catalytic converter by interrupting the normal operation mode with a test operation mode of the fuel control means during a test period, comprising (a) conducting closed loop fuel control based on at least the first EGO signal without the second EGO signal, with air to fuel ratio perturbations comprising an initial 5 second lean interval of air to fuel ratio 5% greater than stoichiometry followed by 30-75 rich intervals of air to fuel ratio 3%-5% less than stoichiometry alternating sinusoidally with equal and opposite lean intervals;

(E) determining an efficiency value based on the number of said perturbations, following the initial lean interval, detected by the first EGO sensor means versus the number detected by the second EGO sensor means;

(F) comparing the efficiency value to a predetermined stored value corresponding to a minimum acceptable efficiency of the catalytic converter; and (G) generating a catalytic converter failure signal when the comparison of step (F) indicates catalytic converter efficiency below the minimum acceptable efficiency.

11. Apparatus for controlling the air to fuel ratio of an air and fuel mixture fed to an internal combustion engine, for treating exhaust gas from the engine, and for periodically monitoring catalytic converter efficiency in treating the exhaust gas, comprising:

(A) first exhaust gas conduit means for passing upstream exhaust gas from the engine to the catalytic converter, comprising first EGO sensor means exposed to the upstream exhaust gas for generating a first EGO signal having a value corresponding to oxygen content level therein;

(B) second exhaust gas conduit means for passing downstream exhaust gas from the catalytic converter, comprising second EGO sensor means exposed to the downstream exhaust gas for generating a second EGO signal having a value corresponding to oxygen content level therein;

(C) fuel control means for controlling the air to fuel ratio at which fuel is supplied to the engine in response to a fuel flow control signal, having a normal operation mode and a test operation mode, the fuel control means comprising (a) a fuel flow control signal generator means for generating the fuel flow control signal, and (b) a perturbation signal generator means for generating an initial lean interval signal adapted to increase the air to fuel ratio 3% to 7% from a mean air to fuel ratio value corresponding to a stoichiometric ratio for an initial interval of 1 to 10 seconds followed by a series of alternating rich and lean signals adapted to decrease and then increase, respectively, the air to fuel ratio 3% to 7% from said mean air to fuel ratio value for 50 to 200 msec each, the fuel control signal being generated by the fuel flow control signal generator means based on:

in the normal operation mode the first EGO signal and the second EGO signal to maintain the air to fuel ratio within a limit cycle defining a range about the mean air to fuel ratio value; and in a test operation mode the first EGO signal and the perturbation signal without the second EGO signal; and (D) counting means for (a) detecting and counting, during the test operation mode, a first number of air to fuel ratio perturbations in the upstream exhaust gas and a second number of air to fuel ratio perturbations in the downstream exhaust gas, (b) for calculating a catalytic converter efficiency value based on said first and second numbers, (c) for comparing the catalytic converter efficiency value to a predetermined stored value corresponding to minimum acceptable efficiency of the catalytic converter, and (d) for initiating a catalytic converter failure signal when the catalytic converter efficiency value indicates catalytic converter efficiency less than the minimum acceptable efficiency.

* * * * *